United States Patent
Kosukegawa et al.

(10) Patent No.: US 11,382,220 B2
(45) Date of Patent: Jul. 5, 2022

(54) DISPLAY APPARATUS

(71) Applicant: Ricoh Company, Ltd., Tokyo (JP)

(72) Inventors: Risa Kosukegawa, Kanagawa (JP); Akihisa Mikawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 84 days.

(21) Appl. No.: 17/095,235

(22) Filed: Nov. 11, 2020

(65) Prior Publication Data

US 2021/0153364 A1 May 20, 2021

(30) Foreign Application Priority Data

Nov. 19, 2019 (JP) .............................. JP2019-209077
Oct. 9, 2020 (JP) .............................. JP2020-171492

(51) Int. Cl.
*H05K 7/02* (2006.01)
*H05K 7/04* (2006.01)
*H05K 5/00* (2006.01)
*G06F 1/16* (2006.01)

(52) U.S. Cl.
CPC ......... *H05K 5/0017* (2013.01); *G06F 1/1637* (2013.01)

(58) Field of Classification Search
USPC .......................................................... 361/807
See application file for complete search history.

(56) References Cited

U.S. PATENT DOCUMENTS

| | | | | |
|---|---|---|---|---|
| 6,023,898 A | * | 2/2000 | Josey | ..................... E04B 1/2403 52/657 |
| 2008/0074877 A1 | * | 3/2008 | Hsieh | ................ G02F 1/133608 362/362 |

FOREIGN PATENT DOCUMENTS

| | | |
|---|---|---|
| JP | 2000-203195 | 7/2000 |
| JP | 2003-029872 | 1/2003 |

* cited by examiner

*Primary Examiner* — Hung S. Bui
(74) *Attorney, Agent, or Firm* — Xsensus LLP

(57) ABSTRACT

A display apparatus includes a display including a screen and a housing frame to which the display is attached. The housing frame includes a plurality of frame members that surround the screen and a corner member to join two of the plurality of frame members with double-sided adhesive tape. Each frame members includes a joint portion, to be coupled with the corner member, including a first wall portion extending in a direction perpendicular to the screen; a second wall portion on a center side of the screen relative to the first wall portion, extending in a direction parallel to the screen; and a corner portion including a curved center-side face connecting a center-side face of the first wall portion and a center-side face of the second wall portion on the center side of the screen.

9 Claims, 17 Drawing Sheets

DISPLAY APPARATUS

CROSS-REFERENCE TO RELATED APPLICATIONS

This patent application is based on and claims priority pursuant to 35 U.S.C. § 119(a) to Japanese Patent Application Nos. 2019-209077, filed on Nov. 19, 2019, and 2020-171492, filed on Oct. 9, 2020, in the Japan Patent Office, the entire disclosure of each of which is hereby incorporated by reference herein.

BACKGROUND

Technical Field

Embodiments of the present disclosure relate to a display apparatus.

Related Art

Regarding thin display apparatuses or whiteboards, there is a housing frame including four frame members and four corner members. Such a technology is used, for example, in thin display apparatuses such as liquid crystal modules.

SUMMARY

According to an embodiment of this disclosure, a display apparatus includes a display including a screen; and a housing including a housing frame to which the information display is attached. The housing frame includes a plurality of frame members surrounding the screen; and a corner member coupling two of the plurality of frame members with double-sided adhesive tape. Each frame member includes a joint portion coupled with the corner member with the double-sided adhesive tape. The joint portion includes a first wall portion extending in a direction perpendicular to the screen, a second wall portion on a center side of the screen relative to the first wall portion, and a corner portion connecting the first wall portion and the second wall portion. The second wall portion extends in a direction parallel to the screen. The corner portion includes a curved center-side face connecting a center-side face of the first wall portion and a center-side face of the second wall portion on the center side of the screen.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
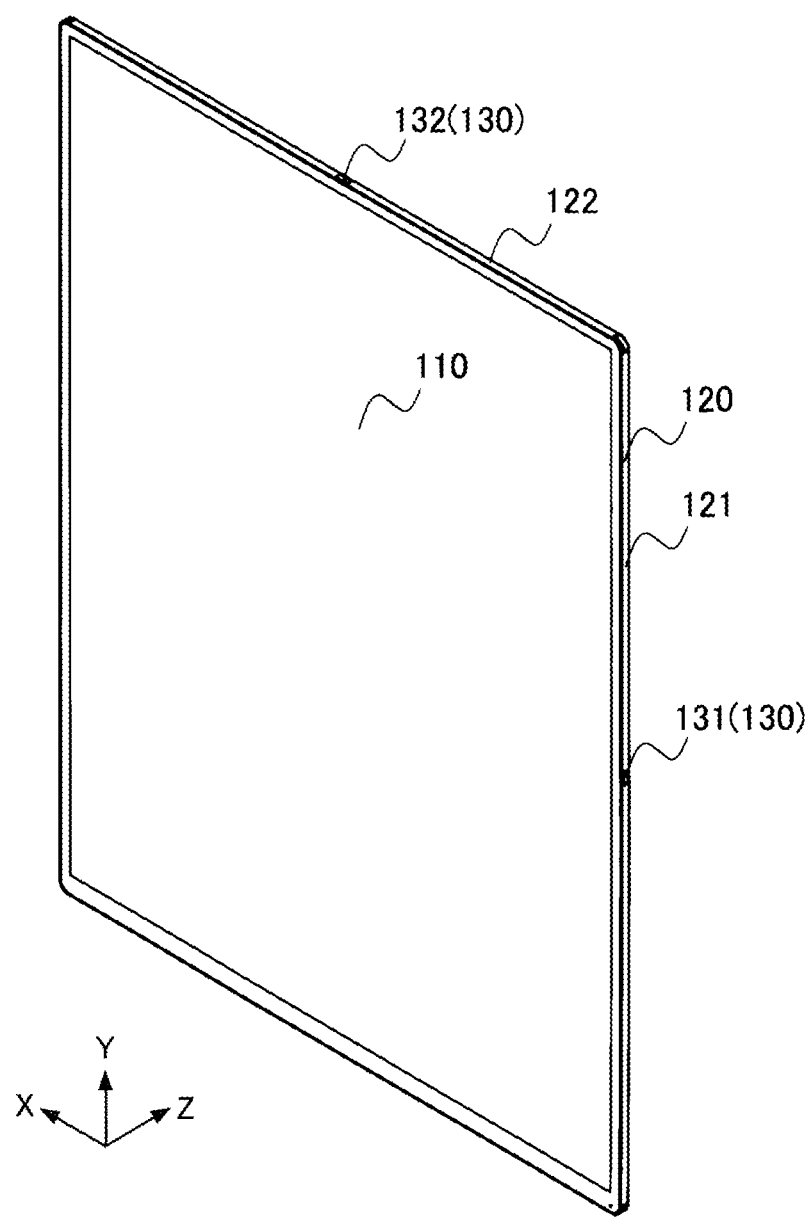
FIG. 1 is a perspective view of an information display apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Referring now to the drawings, wherein like reference numerals designate identical or corresponding parts throughout the several views thereof, embodiments of this disclosure are described. As used herein, the singular forms "a," "an," and "the" are intended to include the plural forms as well, unless the context clearly indicates otherwise.

Further, in order to facilitate understanding, the scale of each part in the drawing may differ from the actual scale. In the directions such as parallel, right angle, orthogonal, horizontal, vertical, up and down, and lateral directions, a deviation that does not impair the effect of the embodiment is allowed. The shape of a corner is not limited to a rectangular shape, and may be rounded into an arcuate shape. The terms parallel, right-angled, orthogonal, horizontal, and vertical may include substantially parallel, substantially right-angled, substantially orthogonal, substantially horizontal, and substantially vertical, respectively.

Information Display Apparatus

Figure 2:
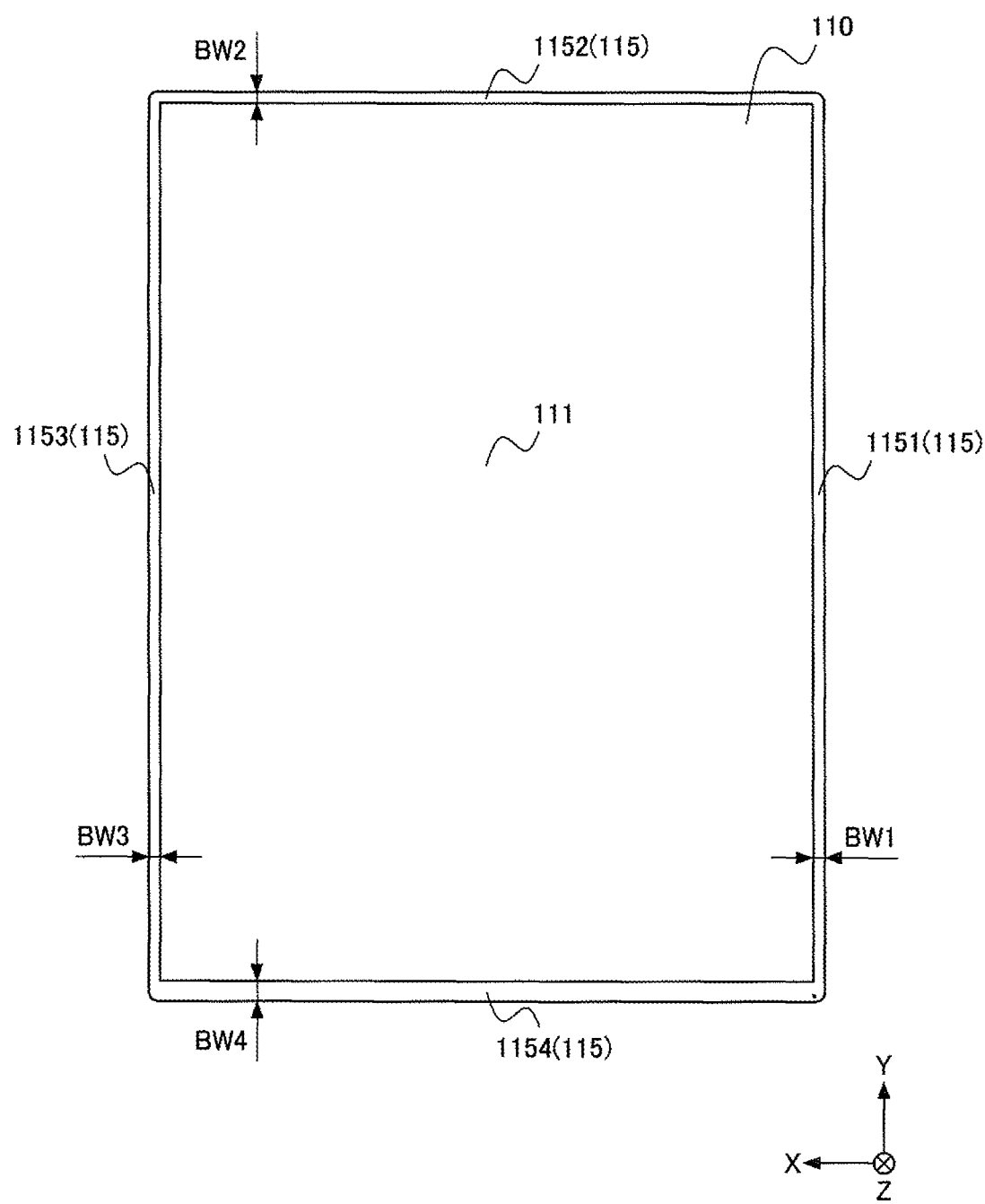
FIG. 2 is a front view of the information display apparatus illustrated in FIG. 1.
Figure 3:
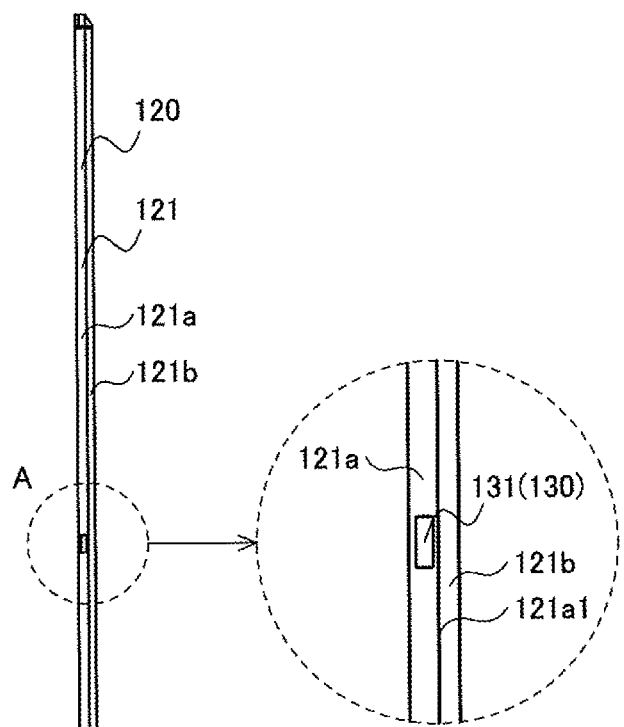
FIG. 3 is a right side view of the information display apparatus illustrated in FIG. 1.
Figure 3:
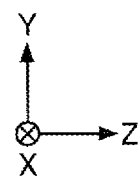
Figure 4:
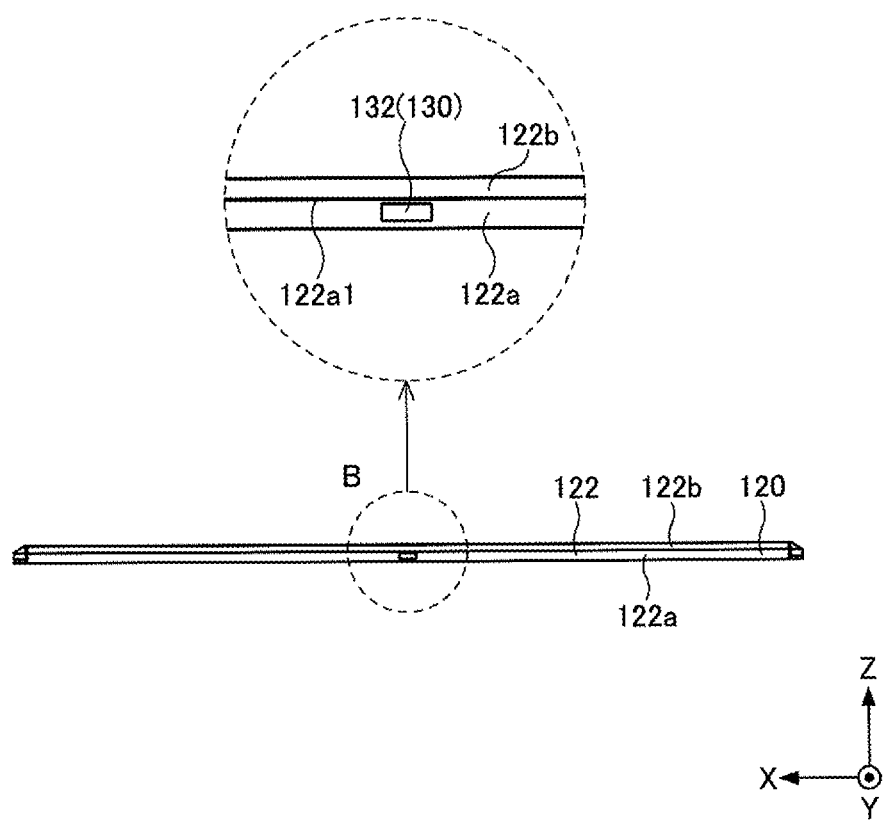
FIG. 4 is a top view of the information display apparatus illustrated in FIG. 1.
Figure 5:
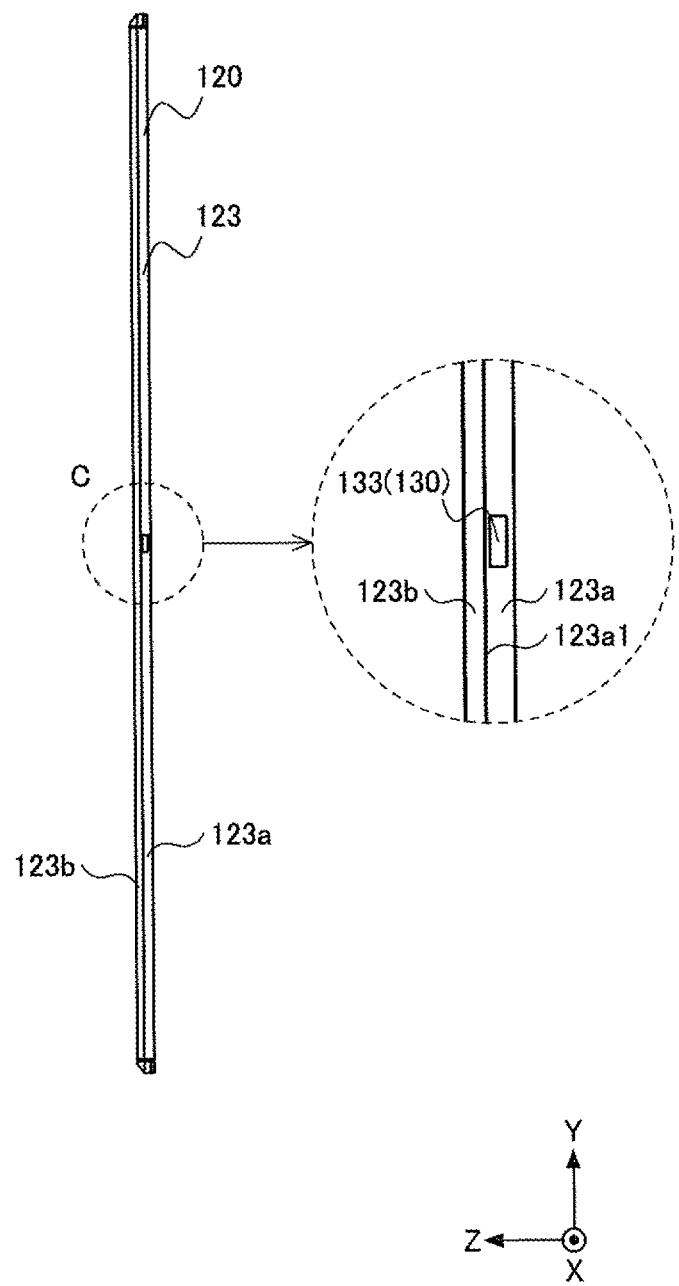
FIG. 5 is a left side view of the information display apparatus illustrated in FIG. 1.
Figure 6:
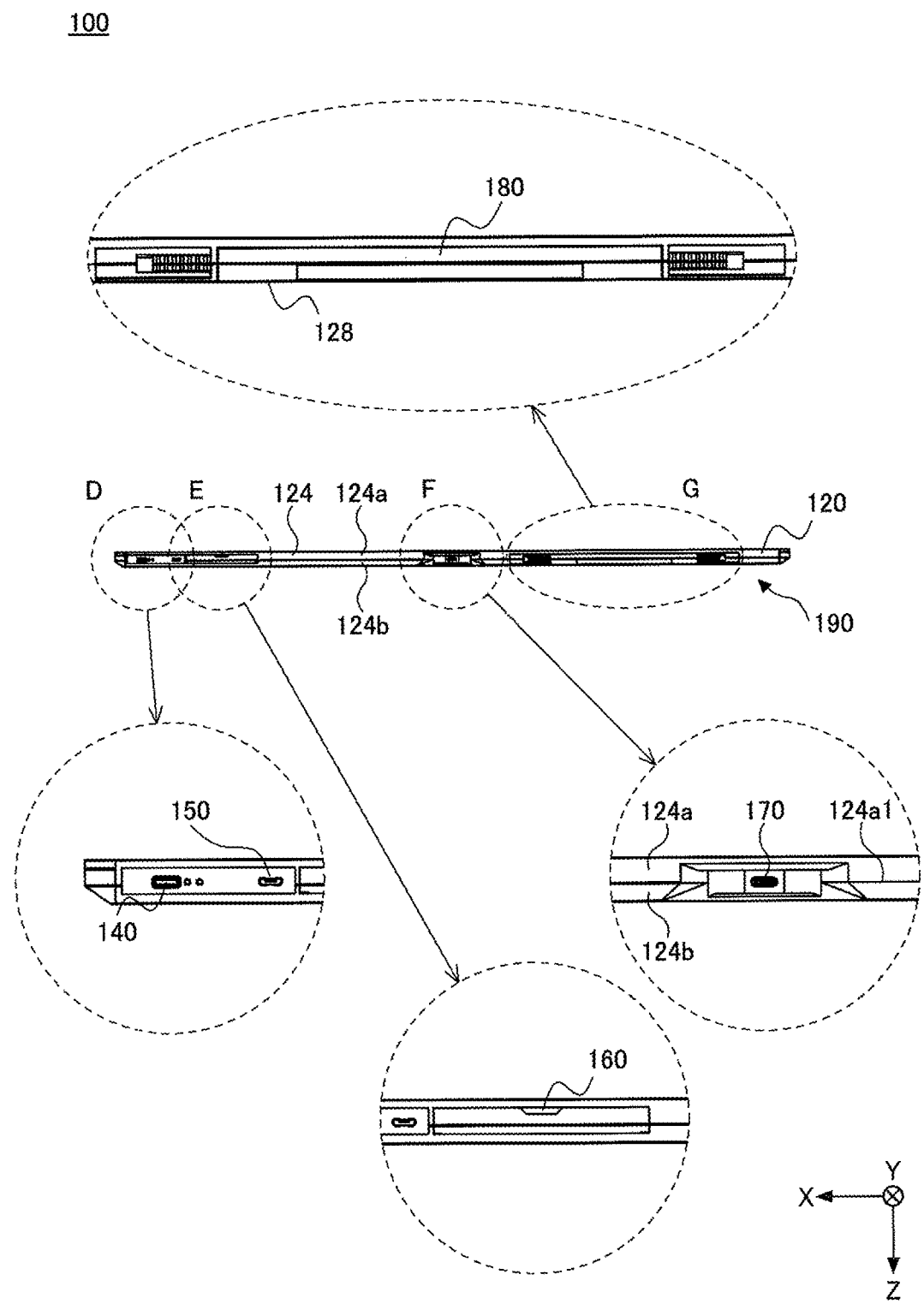
FIG. 6 is a bottom view of the information display apparatus illustrated in FIG. 1.
Figure 7:
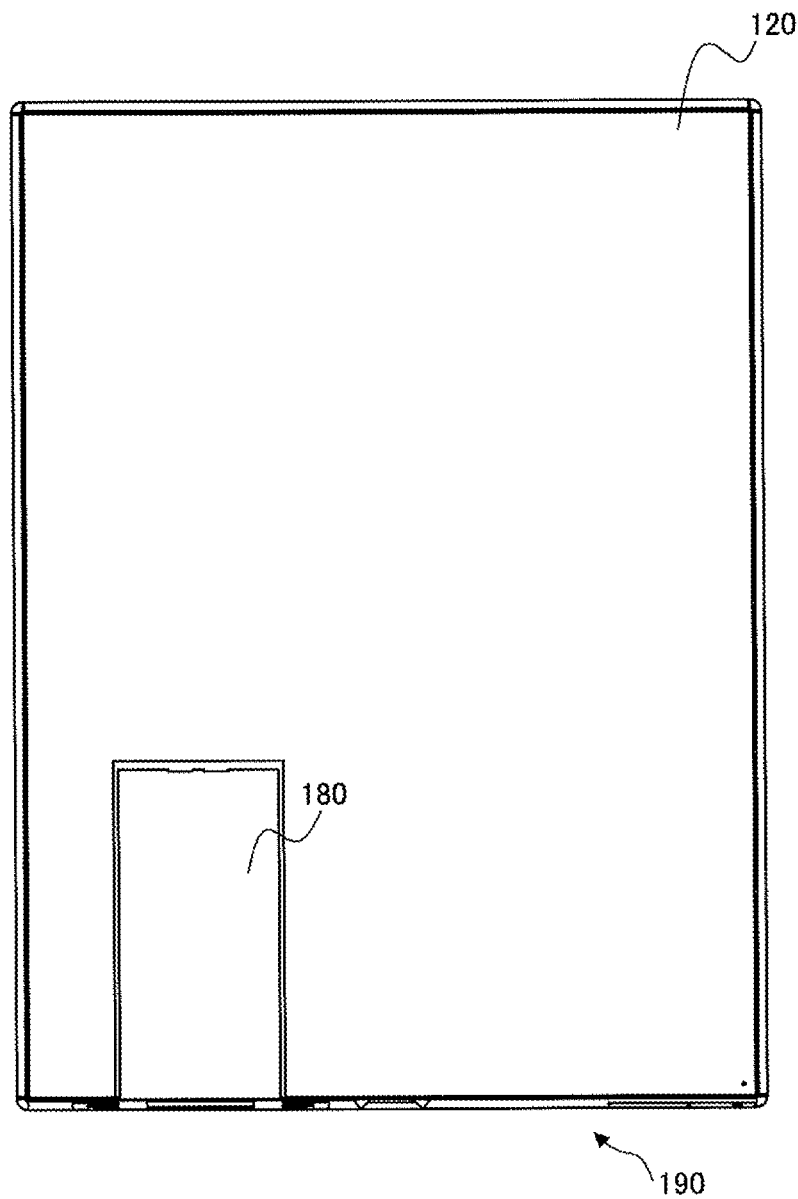
FIG. 7 is a rear view of the information display apparatus illustrated in FIG. 1.
Figure 7:
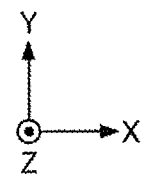
Figure 8:
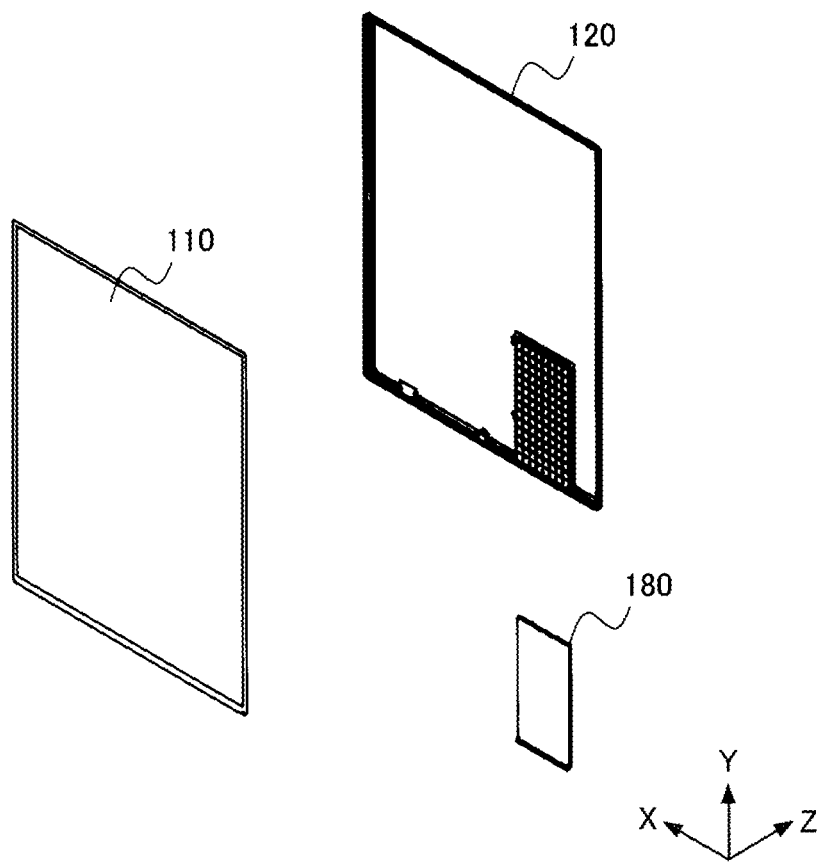
FIG. 8 is an exploded perspective view of the information display apparatus illustrated in FIG. 1.

FIG. 1 is a perspective view of an information display apparatus 100 according to the present embodiment. FIG. 2 is a front view of the information display apparatus 100 according to the present embodiment. FIG. 3 is a right side view of the information display apparatus 100 according to the present embodiment. FIG. 4 is a top view of the information display apparatus 100 according to the present embodiment. FIG. 5 is a left side view of the information display apparatus 100 according to the present embodiment. FIG. 6 is a bottom view of the information display apparatus 100 according to the present embodiment. FIG. 7 is a rear view of the information display apparatus 100 according to the present embodiment. FIG. 8 is an exploded perspective view of the information display apparatus 100 according to the present embodiment.

For convenience of explanation, a virtual three-dimensional coordinate system (XYZ Cartesian coordinate system) including an X-axis, a Y-axis, and a Z-axis that are orthogonal to each other may be set in the drawings. The coordinate system is defined for the sake of explanation, and does not limit the posture of the information display apparatus 100 or the like.

In the present disclosure, unless otherwise specified, the X-axis direction is a direction parallel to a screen 111 (a screen, see FIG. 2) of the information display apparatus 100, and is a short-side direction of the screen 111. The Y-axis direction is a direction parallel to the screen 111 of the information display apparatus 100, and is a longitudinal direction of the screen 111. In other words, the XY plane parallel to the X-axis direction and the Y-axis direction is a plane parallel to the screen 111 of the information display apparatus 100. The Z axis extends in a direction perpendicular to the X and Y axes. In other words, the YZ plane parallel to the Y-axis direction and the Z-axis direction is a plane perpendicular to the screen 111 of the information display apparatus 100. Similarly, the ZX plane parallel to the X-axis direction and the Z-axis direction is a plane perpendicular to the screen 111 of the information display apparatus 100.

The X-axis direction may be referred to as a lateral direction, the Y-axis direction may be referred to as a vertical direction, and the Z-axis direction may be referred to as a thickness direction. Further, the +X side and the −X side with respect to a target may be referred to as the left side and the right side, respectively. Similarly, the +Y side and the −Y side with respect to a target may be referred to as the upper side and the lower side, respectively, and the +Z side and the −Z side with respect to a target may be referred to as the back side (or rear side) and the front side, respectively. In some cases, viewing the information display apparatus 100 from the −Z side is referred to as viewing from the front side. In some cases, viewing the information display apparatus 100 from the +Z side is referred to as viewing from the back side.

The information display apparatus 100 includes an information display unit 110 (an information display) and a housing 120 (a housing).

The information display apparatus 100 displays a screen image of a personal computer (PC) or the like. Further, letters and illustrations can be freely written on the information display unit 110 using a dedicated pen-type input device. As one feature, as illustrated in FIGS. 1 to 6, the information display apparatus 100 according to the present embodiment is thin, and accordingly light. This feature enables production of large display products (large in inches) with excellent portability. Further, as illustrated in FIGS. 3 to 6, as another feature, in the information display apparatus 100 according to the present embodiment, the entire back face is flat. Therefore, for example, the information display apparatus 100 can be placed flat on a desk, and a plurality of viewers can have a discussion around the information display apparatus 100. Further, the information display apparatus 100 can accept inputs with a plurality of pen-type input devices so that a plurality of persons can write at the same time. Further, both the main body of the information display apparatus 100 and the pen-type input device are dustproof and waterproof so that the information display apparatus 100 can be used outdoors.

Information Display Unit

Referring to FIG. 2, the information display unit 110 includes the screen 111 that is constructed of pixels and has a displaying capability, and a screen frame 115 that surrounds the screen 111. The screen 111 is parallel to the XY plane of the XYZ Cartesian coordinate system in the drawings. The screen frame 115 is a so-called display frame or bezel. The screen frame 115 does not have display capability. In the front view of FIG. 2, the screen frame 115 includes a right screen-frame member 1151, an upper screen-frame member 1152, a left screen-frame member 1153, and a lower screen-frame member 1154, which are respectively on the right, on the left, on the upper side, and on the lower side of the screen 111. A description is given below of a width (bezel width) of each frame portion, that is, the length from the boundary between each frame portion and the screen 111 to the outline of the frame portion. The bezel widths of the right screen-frame member 1151, the upper screen-frame member 1152, and the left screen-frame member 1153 are the same as each other. That is, a bezel width BW1 of the right screen-frame member 1151, a bezel width BW2 of the upper screen-frame member 1152, and a bezel width BW3 of the left screen-frame member 1153 are equal to each other. Further, the bezel of the lower screen-frame member 1154 is wider than each of the right screen-frame member 1151, the upper screen-frame member 1152, and the left screen-frame member 1153. That is, the lower screen-frame member 1154 has a widest bezel among the screen-frame members 1151 to 1154. In other words, the bezel width BW4 of the lower screen-frame member 1154 is wider than each of the bezel width BW1 of the right screen-frame member 1151, the bezel width BW2 of the upper screen-frame member 1152, and the bezel width BW3 of the left screen-frame member 1153. This structure makes it easier to recognize the orientation of the information display apparatus 100 when viewed from the front side.

In the present disclosure, each element of the information display apparatus 100 is specified by using the right side, the left side, the upper side, and the lower side as viewed from the front, but such positional expressions are used for the sake of explanation and do not limit the posture of the information display apparatus 100. For example, the information display apparatus 100 may be placed in a horizontal posture. Alternatively, the information display apparatus 100 may be placed with the lower screen-frame member 1154 on the upper side, the left side, or the right side. This also applies to the subsequent descriptions.

Housing

The housing 120 is shaped into a substantially rectangular parallelepiped. The information display unit 110 is attached to the front side of the housing 120. The housing 120 holds the information display unit 110 and further holds therein a circuit or the like to drive the information display unit 110.

Referring to FIGS. 1 and 3 to 6, the housing 120 includes a right side face 121, an upper face 122, a left side face 123, and a lower face 124, which are on the right side, on the upper side, on the left side, and on the lower side as viewed from the front side. The right side face 121, the upper face 122, the left side face 123, and the lower face 124 serve as a plurality of side faces surrounding the screen 111 of the information display unit 110. In other words, the housing 120 includes a plurality of side faces surrounding the screen 111.

The right side face 121 is on the right side of the screen 111. The right side face 121 includes a vertical face 121a perpendicular to the screen 111 and an inclined face 121b inclined relative to the direction perpendicular to the screen 111. The vertical face 121a is a plane parallel to the YZ plane. The inclined face 121b is inclined from aback end 121a1 of the vertical face 121a to the left side relative to the YZ plane, when viewed from the front side.

The upper face 122 is above the screen 111. The upper face 122 includes a vertical face 122a perpendicular to the screen 111 and an inclined face 122b inclined relative to the direction perpendicular to the screen 111. The vertical face 122a is a plane parallel to the ZX plane. The inclined face 122b is inclined from a back end 122a1 of the vertical face 122a to the lower side relative to the ZX plane, when viewed from the front side.

The left side face 123 is on the left side of the screen 111. The left side face 123 includes a vertical face 123a perpendicular to the screen 111 and an inclined face 123b inclined relative to the vertical direction of the screen 111. The vertical face 123a is a plane parallel to the YZ plane. The inclined face 123b is inclined from aback end 123a1 of the vertical face 123a to the right side relative to the YZ plane, when viewed from the front side.

The lower face 124 is below the screen 111. The lower face 124 includes a vertical face 124a perpendicular to the screen 111 and an inclined face 124b inclined relative to the vertical direction of the screen 111. The vertical face 124a is a plane parallel to the ZX plane. The inclined face 124b is inclined upward, from a back end 124a1 of the vertical face 124a, relative to the ZX plane when viewed from the front side.

The information display apparatus 100 according to the present embodiment includes a plurality of infrared sensors in order to transmit and receive information to and from an adjacent information display apparatus 100. In the housing 120, the vertical face 121a of the right side face 121 includes an infrared sensor window 131 (in FIG. 3). The vertical face 122a of the upper face 122 includes an infrared sensor window 132 (in FIG. 4). The vertical face 123a of the left side face 123 includes an infrared sensor window 133 (in FIG. 5). The infrared sensor transmits and receives infrared signals through the infrared sensor windows 131, 132, and 133. The infrared sensor windows 131, 132, and 133 may be collectively referred to as infrared sensor windows 130.

Referring to FIG. 6, the housing 120 includes a power button 140, a communication connector 150, a card connector cover 160, and a power connector 170 on the lower face 124.

The power button 140 is operated, that is, touched, by the user for turning on and off the power of the information display apparatus 100. The power button 140 is an example of an operation device operated by the user for operating the information display apparatus 100. The operation device of the information display apparatus 100 according to the present embodiment includes at least the power button 140.

In addition to the power button 140, the operation unit may further include a button or the like for operating the information display apparatus 100. For example, the operation device may include a menu button for displaying a menu on the screen, a cursor movement button for selecting a menu, a confirmation button, and the like.

The communication connector 150 is a data communication device that connects to an external device such as a PC or a universal serial bus (USB) flash memory for data communication.

The card connector cover 160 contains a connector for connection to a card such as a secure digital (SD) card or a subscriber identity module (SIM) card.

A power cable as a power connector is inserted into the power connector 170 from the outside of the information display apparatus 100. Thus, power is supplied to the power connector 170 from the outside.

The power button 140, the communication connector 150, the connector inside the card connector cover 160, and the power connector 170 may be collectively referred to as interface members 190.

Further, the housing 120 includes a battery insertion portion 128 disposed on the lower face 124. Into the battery insertion portion 128, a battery 180 is inserted. The information display apparatus 100 according to the present embodiment can be driven with a battery. The battery 180 is not built-in but is removably inserted. Specifically, the battery 180 can be attached to and detached from the battery insertion portion 128 from a direction (Y-axis direction) perpendicular to the lower face 124.

The information display apparatus 100 according to the present embodiment includes the interface members 190 and a battery insertion port 128a on the lower face 124 of the housing 120. The lower face 124 is adjacent to the lower screen-frame member 1154 which is wider than other screen-frame members 1151, 1152, and 1153. The user operates the interface members 190 to use the information display apparatus 100. The user inserts and removes the battery 180 to and from the battery insertion port 128a. Portions operated by the user are collected on the lower face 124 of the housing 120 adjacent to the lower screen-frame member 1154 which is wider than other screen-frame members 1151, 1152, and 1153.

The housing 120 will be described in more detail.

Figure 9:
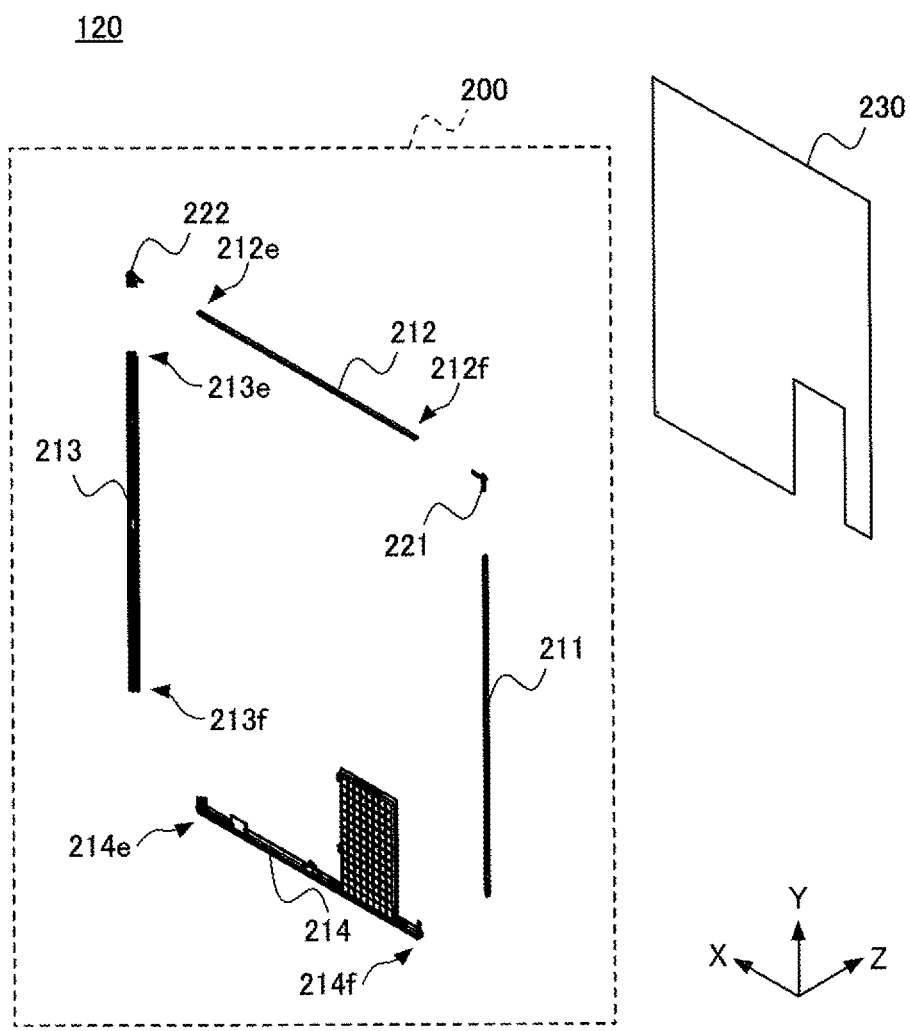
FIG. 9 is an exploded perspective view of a housing frame of the information display apparatus illustrated in FIG. 1.

FIG. 9 is an exploded perspective view of the housing 120 of the information display apparatus 100 according to the present embodiment. The housing 120 of the information display apparatus 100 includes four frame members, namely, a right frame member 211, an upper frame member 212, a left frame member 213 (e.g., a first frame member), and a lower frame member 214; two corner members, namely, an upper right corner member 221 and an upper left corner member 222 (a first corner member); and a back plate 230. The four frame members (the right frame member 211, the upper frame member 212, the left frame member 213, and the lower frame member 214) and the two corner members (the upper right corner member 221 and the upper left corner member 222) are assembled into a housing frame 200 (a housing frame). The back plate 230 is attached to the back side of the housing frame 200. As the back plate 230 is attached to the housing frame 200, the housing 120 is constructed.

The information display unit 110 is attached to the front side (−Z side) of the housing frame 200 of the housing 120. As a result, the information display apparatus 100 is constructed.

Assembly of Housing Frame

A description is given of the connection between the frame member of the housing frame 200 and the corner member. Hereinafter a description is given of the connection between the upper left corner member 222, the upper frame member 212, and the left frame member 213.

Figure 10:
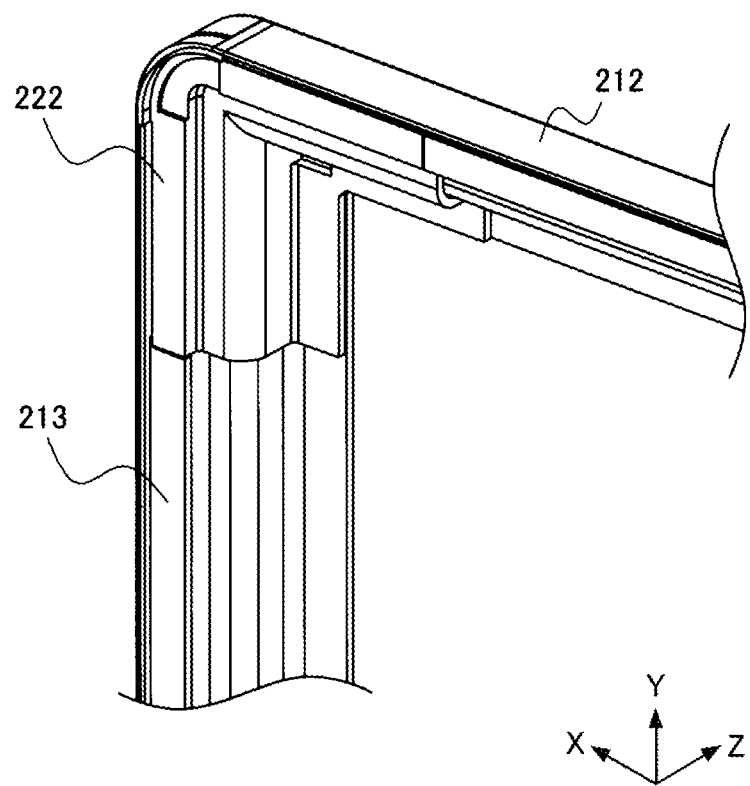
FIG. 10 is an enlarged perspective view illustrating the vicinity of a corner member of the information display apparatus illustrated in FIG. 1.
Figure 11:
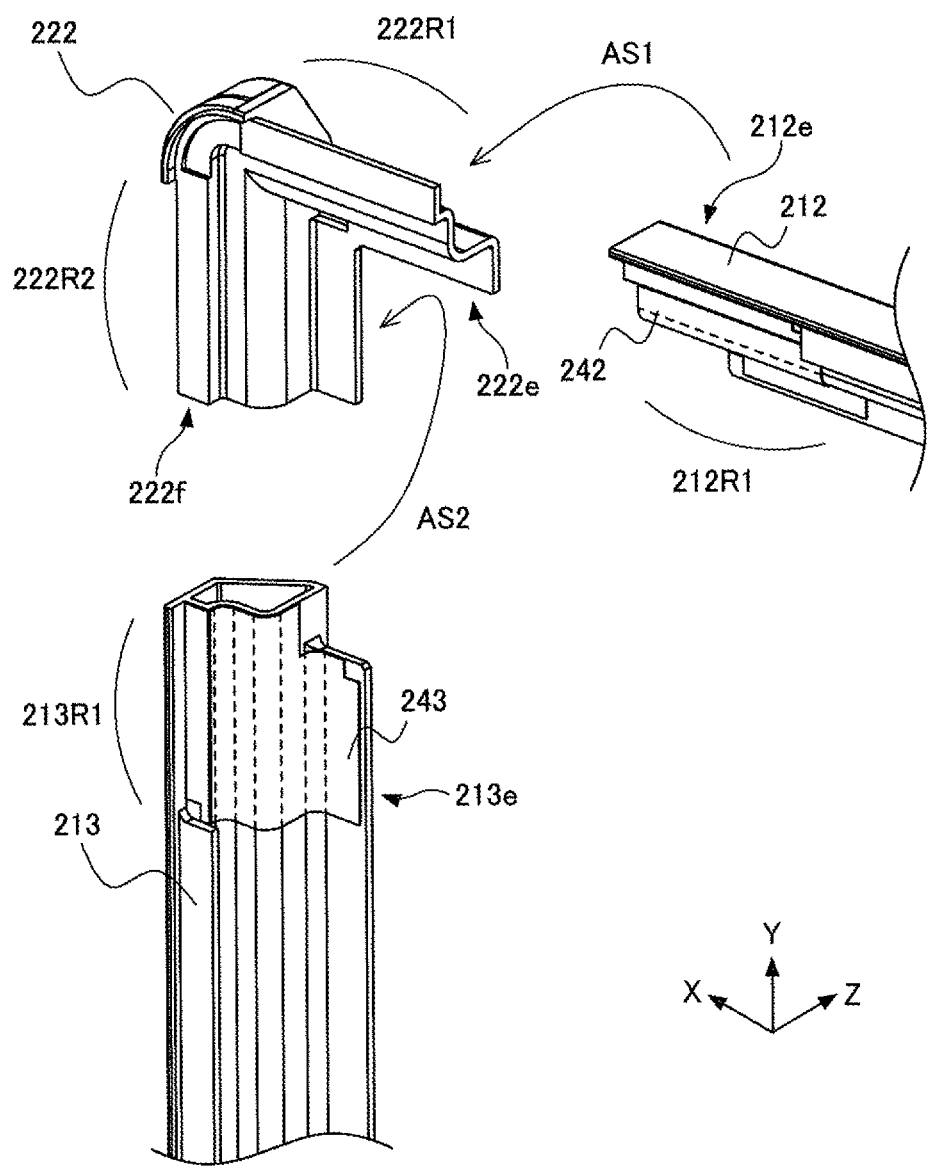
FIG. 11 is an exploded perspective view of the vicinity of the corner member illustrated in FIG. 10.

FIG. 10 is an enlarged perspective view illustrating the vicinity of the upper left corner member 222 of the information display apparatus 100. FIG. 11 is an exploded perspective view illustrating the upper left corner member 222 and adjacent members, namely, the upper frame member 212 and the left frame member 213 (e.g., a plurality of frame members surrounding the screen). Thus, the upper left corner member 222 serves as a corner member coupling two of the plurality of frame members.

A right end portion 222e of the upper left corner member 222 includes a joint region 222R1. To the joint region 222R1, the upper frame member 212 is attached with double-sided adhesive tape 242. Further, a lower end portion 222f of the upper left corner member 222 includes a joint region 222R2. To the joint region 222R2, the left frame member 213 is attached with double-sided adhesive tape 243. The joint region of the corner member may be referred to as a joint portion to be attached with the frame member by double-sided adhesive tape.

A left end portion 212e of the upper frame member 212 includes a joint region 212R1 (e.g., a joint portion coupled with the corner member). To the joint region 212R1, the upper left corner member 222 is attached with the double-sided adhesive tape 242. The double-sided adhesive tape 242 is attached to the joint region 212R1. The double-sided adhesive tape 242 is one continuous piece. As indicated by arrow AS1 in FIG. 11, from the back side of the paper on which FIG. 1 is drawn, the joint region 212R1 of the upper frame member 212 is pressed against the joint region 222R1 of the upper left corner member 222. As the joint region 212R1 of the upper frame member 212 is pressed against the joint region 222R1 of the upper left corner member 222, the upper frame member 212 is attached to the upper left corner member 222. The joint region of the frame member may be referred to as a joint portion to be attached with the corner member by double-sided adhesive tape.

An upper end portion 213e of the left frame member 213 includes a joint region 213R1. To the joint region 213R1, the upper left corner member 222 is joined. The double-sided adhesive tape 243 is attached to the joint region 213R1. The double-sided adhesive tape 243 is one continuous piece. As indicated by arrow AS2 illustrated in FIG. 11, from the back side of the paper on which FIG. 11 is drawn, the joint region 213R1 of the left frame member 213 is pressed against the joint region 222R2 of the upper left corner member 222. As the joint region 213R1 of the left frame member 213 is pressed against the joint region 222R2 of the upper left corner member 222, the left frame member 213 is attached to the upper left corner member 222.

In the above description, the double-sided adhesive tape 242 and the double-sided adhesive tape 243 are attached to the joint region 212R1 of the upper frame member 212 and the joint region 213R1 of the left frame member 213, respectively. However, the place where the double-sided adhesive tape is attached is not limited to the frame member. For example, double-sided adhesive tape may be respectively attached to the joint region 222R1 and the joint region 222R2 of the upper left corner member 222, which is a corner member. That is, the double-sided adhesive tape may be attached to the joint region of the corner member to attach the frame member.

Frame Member

Next, the shape of the frame member is described. The left frame member 213 is described below.

Figure 12:
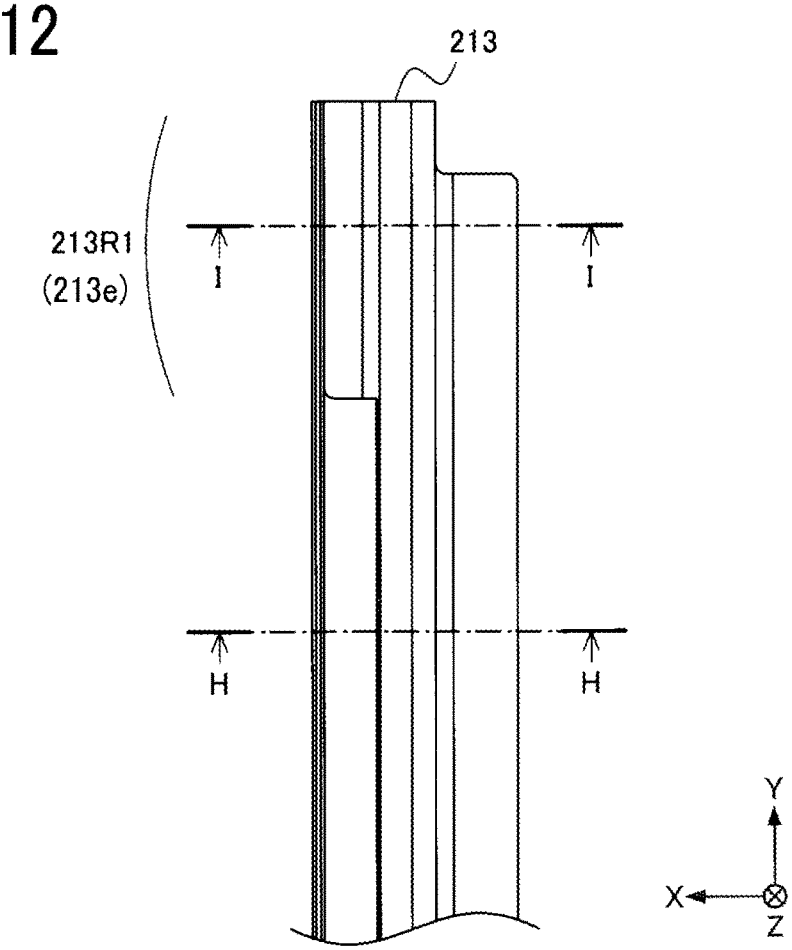
FIG. 12 is an enlarged view of a portion of a frame member of the information display apparatus illustrated in FIGS. 10 to 11.

FIG. 12 is an enlarged view of a portion of the left frame member 213 of the information display apparatus 100 according to the present embodiment. Specifically, FIG. 12 is an enlarged view of a portion including the upper end portion 213e of the left frame member 213, as viewed from the front side.

The left frame member 213 extends in the vertical direction in FIG. 12 and is rod-shaped. Inside the left frame member 213, a hollow 2130 (see FIGS. 13 and 15) is formed. With the hollow 2130 inside the left frame member 213, the weight can be reduced while ensuring the strength of the left frame member 213.

The left frame member 213 includes, in the upper end portion 213e, the joint region 213R1 (e.g., a joint portion coupled with the corner member) to which the upper left corner member 222 is joined. Note that, referring to FIG. 20, the left frame member 213 further includes, in a lower end portion 213f (FIG. 9) thereof, a joint region 213R2 to which the lower frame member 214 is joined. The shape of the right frame member 211 is laterally symmetrical with the shape of the left frame member 213.

The upper frame member 212 according to the present embodiment includes the joint region 212R1, to which the upper left corner member 222 is joined, in the left end portion 212e and another joint region, to which the upper right corner member 221 is joined, in a right end portion 212f (FIG. 9). That is, the upper frame member 212 includes the joint regions, to which the corner members are joined, in both ends in the horizontal direction, that is, the left end portion 212e and the right end portion 212f. When the upper frame member 212 includes the joint regions coupled with the corner members at both ends in the horizontal direction, the information display apparatus 100 includes at least two corner members.

In the present embodiment, the lower frame member 214 includes a left end portion 214e provided with a joint region 214R1 (FIG. 20) to which the left frame member 213 is joined, and a right end portion 214f (FIG. 9) provided with a joint region to which the right frame member 211 is joined. That is, the lower frame member 214 includes the joint regions, to which the frame members are joined, in both ends in the horizontal direction, that is, the left end portion 214e and the right end portion 214f.

A description is given of the cross-sectional shape of the left frame member 213.

Figure 13:
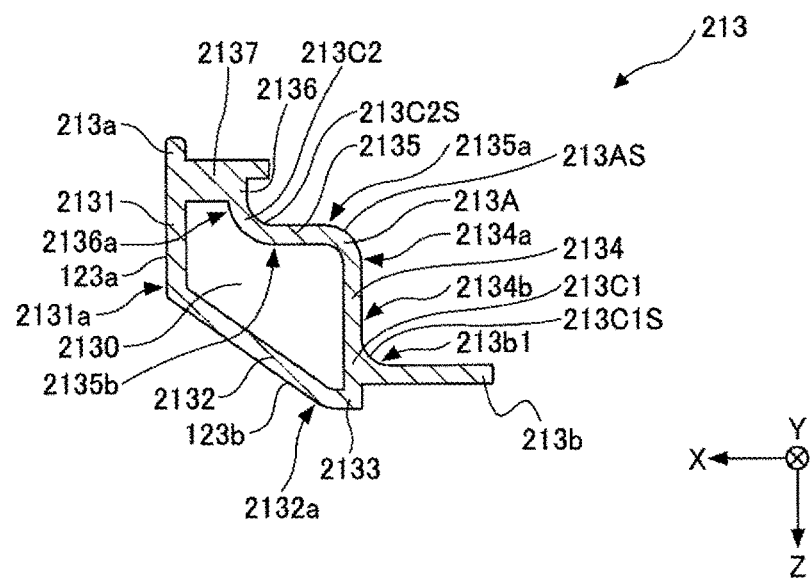
FIG. 13 is a cross-sectional view of the frame member illustrated in FIGS. 10 to 12.

First, a description is given below of the cross-sectional shape of an intermediate area of the left frame member 213 between the joint region 213R1 and the joint region 213R2. FIG. 13 is a cross-sectional view of the left frame member 213 of the information display apparatus 100 according to the present embodiment. Specifically, FIG. 13 is across-sectional view taken along line H-H in FIG. 12. The left frame member 213 includes a perpendicular wall portion 2131 (an outer wall portion), an inclined wall portion 2132, a lateral wall portion 2133, a perpendicular wall portion 2134 (a center-side wall portion), a lateral wall portion 2135, a perpendicular wall portion 2136 (a center-side wall portion), and a lateral wall portion 2137. The left frame member 213 includes a hollow 2130 surrounded by the perpendicular wall portion 2131, the inclined wall portion 2132, the lateral wall portion 2133, the perpendicular wall portion 2134, the lateral wall portion 2135, the perpendicular wall portion 2136, and the lateral wall portion 2137.

The perpendicular wall portion 2131 and the inclined wall portion 2132 form an outer side face of the housing 120. Specifically, the face of the perpendicular wall portion 2131 on the left side in FIG. 13 serves as the vertical face 123a (FIG. 5) of the left side face 123. The face of the inclined wall portion 2132 positioned obliquely on the lower left side in FIG. 13 serves as the inclined face 123b (FIG. 5) of the left side face 123. The perpendicular wall portion 2131 is parallel to the YZ plane. The inclined wall portion 2132 extends from a back end 2131a of the perpendicular wall portion 2131 in a direction inclined to the right when viewed from the front side with respect to the YZ plane. The lateral wall portion 2133 extends from the front to the right from the back end portion 2132a of the inclined wall portion 2132. Further, the lateral wall portion 2133, together with the back plate 230, forms the outer back face of the housing 120. The inclined wall portion 2132 is inclined relative to the perpendicular wall portion 2131 and the lateral wall portion 2133. The inclined wall portion 2132 makes it easier for the user to hold the information display apparatus 100 when the user carries the information display apparatus 100. Further, the inclined wall portion 2132 creates a gap between the installation surface (for example, a wall or a desk) and the housing 120 when the information display apparatus 100 is installed. The gap can be used for wiring. For example, a cable or the like can be passed through the gap, thereby improving the appearance of the information display apparatus 100. In particular, when a plurality of information display apparatuses 100 are installed side by side, wiring can be placed between the information display apparatuses 100.

The perpendicular wall portion 2134, the lateral wall portion 2135, and the perpendicular wall portion 2136 form the inner face of the housing 120. Further, the lateral wall portion 2137 is disposed on the front side of the perpendicular wall portion 2136. The information display unit 110 is mounted on the lateral wall portion 2137. The corner between the lateral wall portion 2137 and the perpendicular wall portion 2131 is provided a protective portion 213a for protecting the information display unit 110. The protective portion 213a protects an end of the information display unit 110. The left frame member 213 further includes a lateral wall portion 213b projecting from the perpendicular wall portion 2134. The back plate 230 is attached to the lateral wall portion 213b from the back side.

The perpendicular wall portion 2134 and the lateral wall portion 2135 are coupled via a rounded corner 213A. The rounded corner 213A connects a front end 2134a of the perpendicular wall portion 2134 and a right end 2135a (a center-side end) of the lateral wall portion 2135. A face of the rounded corner 213A (an example of a second corner portion) closer to the center of the screen 111 (see FIG. 2) is referred to as a center-side face 213AS (an example of a second curved center-side face). The center-side face 213AS (the surface opposite to the hollow 2130, obliquely positioned upper right in FIG. 13) is curved and has a radius of curvature R1 in cross section. The rounded corner 213A is convex when viewed from the upper right in FIG. 13.

Further, the lateral wall portion 213b and the perpendicular wall portion 2134 are coupled via a reversely rounded corner 213C1 projecting to the side different from the rounded corner 213A. In the perpendicular wall portion 2134, a portion extends from a center of the perpendicular wall portion 2134 in the thickness direction (Z-axis direction) to the back side (+Z side) is referred to as a back side portion 2134b. The reversely rounded corner 213C1 connects a left end portion 213b1 of the lateral wall portion 213b with the back side portion 2134b of the perpendicular wall portion 2134. A face of the reversely rounded corner 213C1 closer to the center of the screen 111 (see FIG. 2) is referred to as a center-side face 213C1S. The center-side face 213C1S (the surface opposite to the hollow 2130, obliquely positioned lower right in FIG. 13) is a curved face having a radius of curvature R2 in cross section. The reversely rounded corner 213C1 is concave when viewed from the upper right in FIG. 13.

The lateral wall portion 2135 and the perpendicular wall portion 2136 are coupled via a reversely rounded corner 213C2 (e.g., a corner portion including a curved center-side face). The reversely rounded corner 213C2 connects a left end 2135b of the lateral wall portion 2135 and aback end 2136a of the perpendicular wall portion 2136. A face of the reversely rounded corner 213C2 closer to the center of the screen 111 (see FIG. 2) is referred to as a center-side face 213C2S (e.g., a first curved center-side face). The center-side face 213C2S (the surface opposite to the hollow 2130, obliquely positioned upper right in FIG. 13) is a curved face having a radius of curvature R3 in cross section. The reversely rounded corner 213C2 is concave when viewed from the upper right in FIG. 13.

In the present disclosure, a portion connecting adjacent faces and being convex when viewed from a predetermined direction is referred to as a rounded corner, and a portion connecting adjacent faces and being concave when viewed from the predetermined direction is referred to as a reversely rounded corner. The reversely rounded corner has a first curved face, and the rounded corner has a second curved face projecting in a direction reverse to a projecting direction of the first curved face.

Figure 14:
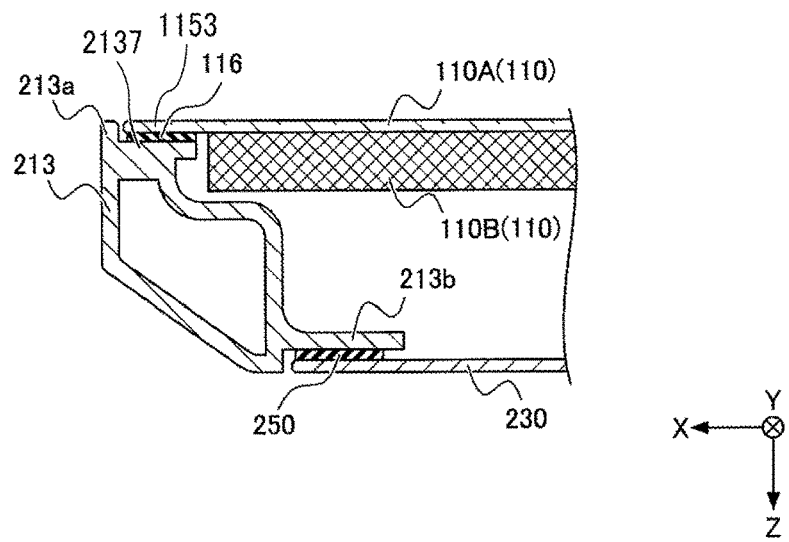
FIG. 14 is a cross-sectional view of a portion of the information display apparatus illustrated in FIG. 1.

The attachment of the information display unit 110 and the back plate 230 to the left frame member 213 is described. FIG. 14 is a cross-sectional view of a portion of the information display apparatus 100 according to the present embodiment.

The information display unit 110 includes a cover glass 110A and a display portion 110B. The display portion 110B is a portion having displaying capability. For example, the display portion 110B includes a display element such as an organic electro luminescence (EL) element, a liquid crystal element, and an electronic paper element; and a circuit for driving the display element. The cover glass 110A protects the display portion 110B. The information display unit 110 is attached to the lateral wall portion 2137 of the left frame member 213 via double-sided adhesive tape 116. Specifically, an end of the cover glass 110A of the information display unit 110 is attached to the lateral wall portion 2137 of the left frame member 213.

The display portion 110B is not present in an end portion of the information display unit 110 (on the side of the left screen-frame member 1153 in FIG. 14). The intermediate portion of the information display unit 110 where both the cover glass 110A and the display portion 110B are present is thicker than the end portion where only the cover glass 110A is present. According to the present embodiment, since the left frame member 213 includes the lateral wall portion 2135 and the perpendicular wall portion 2136, the left frame member 213 does not interfere with the display portion 110B as illustrated in FIG. 14. Since the left frame member 213 does not interfere with the display portion 110B, the width of the portion of the screen frame 115 (the left screen-frame member 1153) where only the cover glass 110A is present can be reduced.

Further, as illustrated in FIG. 14, the protective portion 213a of the left frame member 213 covers the outer end of the cover glass 110A. Since the outer end of the cover glass 110A is covered, the outer end of the cover glass 110A can be protected from an external impact.

The back plate 230 is attached to the outer face (back side face) of the lateral wall portion 213*b* of the left frame member 213 via double-sided adhesive tape 250. The back plate 230, together with the lateral wall portion 2133, forms the back face of the information display apparatus 100.

Figure 15:
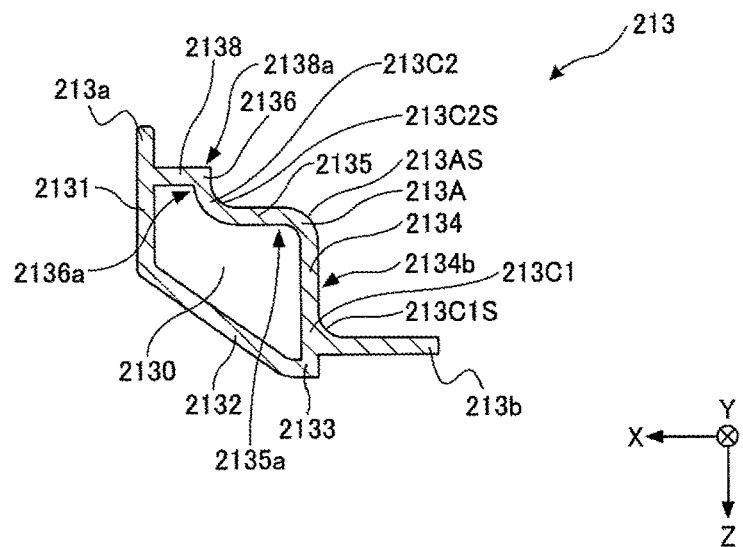
FIG. 15 is a cross-sectional view of the frame member illustrated in FIGS. 10 to 13.

Next, a description is given of the cross-sectional shape of the left frame member 213 in the joint region 213R1. FIG. 15 is a cross-sectional view of the left frame member 213 of the information display apparatus 100 according to the present embodiment. Specifically, FIG. 15 is a cross-sectional view taken along line I-I of FIG. 12. In the joint region 213R1, the left frame member 213 includes the perpendicular wall portion 2131, the inclined wall portion 2132, the lateral wall portion 2133, the perpendicular wall portion 2134, the lateral wall portion 2135, the perpendicular wall portion 2136, and a lateral wall portion 2138. The left frame member 213 includes, in the joint region 231R1, the hollow 2130 surrounded by the perpendicular wall portion 2131, the inclined wall portion 2132, the lateral wall portion 2133, the perpendicular wall portion 2134, the lateral wall portion 2135, the perpendicular wall portion 2136, and the lateral wall portion 2138.

The lateral wall portion 2138 is smaller in the thickness direction than the lateral wall portion 2137. A lateral wall portion 2227 of the upper left corner member 222, which will be described later, is attached to the lateral wall portion 2138 smaller than the lateral wall portion 2137 in the thickness direction. As a result, the front side face of the lateral wall portion 2227 of the upper left corner member 222 attached to the lateral wall portion 2138 of the left frame member 213 is at a height substantially equal to the height of the front face of the lateral wall portion 2137.

The perpendicular wall portion 2136 extends from the vicinity of a right end 2138*a* of the lateral wall portion 2138 in the thickness direction (Z-axis direction), that is, in the direction perpendicular to the screen 111. The lateral wall portion 2135 is on the right side when viewed from the front side of the perpendicular wall portion 2136. The center of the screen 111 is located on the right of the left frame member 213. Therefore, the right side of the left frame member 213 is on the center side of the screen 111. The lateral wall portion 2135 is on the center side of the perpendicular wall portion 2136.

The lateral wall portion 2135 extends from the vicinity of the back end 2136*a* of the perpendicular wall portion 2136 to the right when viewed from the front side, that is, in a direction parallel to the screen 111. The perpendicular wall portion 2134 is located on the right side of the lateral wall portion 2135 when viewed from the front side, that is, located on the center side of the screen 111.

The perpendicular wall portion 2134 extends from the vicinity of the right end 2135*a* of the lateral wall portion 2135 in the thickness direction (Z-axis direction), that is, in the direction perpendicular to the screen 111. The perpendicular wall portion 2134 is closer to the screen 111 than the lateral wall portion 2135. In other words, the perpendicular wall portion 2134 extends from the right end 2135*a*, which is a screen-side (−X side) end of the lateral wall portion 2135 to the side opposite the perpendicular wall portion 2136. The lateral wall portion 213*b* is on the right of the perpendicular wall portion 2134 when viewed from the front side, that is, on the center side of the screen 111.

The reversely rounded corner 213C2 connects the perpendicular wall portion 2136 and the lateral wall portion 2135 so that the center-side face 213C2S of the reversely rounded corner 213C2, that is, the surface thereof on the center side of the screen 111, becomes a curved face. Further, the rounded corner 213A connects the lateral wall portion 2135 and the perpendicular wall portion 2134 so that the center-side face 213AS of the rounded corner 213A, that is, the surface thereof on the center side of the screen 111, becomes a curved face. Further, the reversely rounded corner 213C1 connects the perpendicular wall portion 2134 and the lateral wall portion 213*b* so that the center-side face 213C1S of the reversely rounded corner 213C1, that is, the surface thereof on the center side of the screen 111, becomes a curved face.

The lateral wall portion 213*b* extends from the back side portion 2134*b* to the right when viewed from the front side. The back side portion 2134*b* extends from the center of the perpendicular wall portion 2134 in the thickness direction to the back side.

Figure 16:
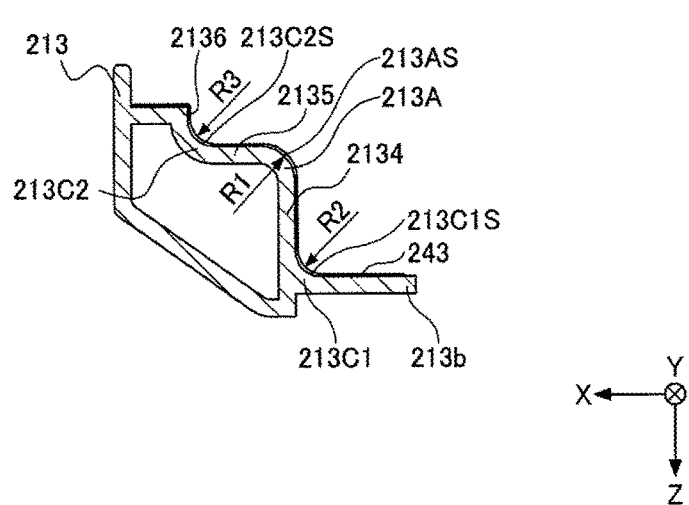
FIG. 16 is a cross-sectional view of the frame member illustrated in FIGS. 10 to 13 with double-sided adhesive tape.

Prior to assembling the housing frame 200, the double-sided adhesive tape 243 is attached to the joint region 213R1 of the left frame member 213. FIG. 16 illustrates a cross-sectional view of the left frame member 213 and illustrates a state where the double-sided adhesive tape 243 is attached to the joint region 213R1 thereof. FIG. 16 is a cross-sectional view of the left frame member 213 of the information display apparatus 100 according to the present embodiment, to which the double-sided adhesive tape 243 is attached.

In the left frame member 213 according to the present embodiment, the center-side face 213C1S of the reversely rounded corner 213C1 (the surface opposite to the hollow 2130 and obliquely positioned on the upper right in FIG. 16) is a curved face having the radius of curvature R2 in cross section. With the curved center-side face 213C1S of the reversely rounded corner 213C1 having the radius of curvature R2 in cross section, the double-sided adhesive tape 243 can be in tight contact with the center-side face of each of the lateral wall portion 213*b*, the reversely rounded corner 213C1, and the perpendicular wall portion 2134. Due to the tight contact of the double-sided adhesive tape 243 with the respective center-side faces of the lateral wall portion 213*b*, the reversely rounded corner 213C1, and the perpendicular wall portion 2134, the joint portion between the left frame member 213 and the upper left corner member 222 assembled with each other can be waterproof.

For example, assume that the reversely rounded corner 213C1 is not a curved face, but the lateral wall portion 213*b* and the perpendicular wall portion 2134 are jointed in a perpendicular manner. In such a configuration, attaching the double-sided adhesive tape 243 without a gap to the perpendicularly jointed portion between the lateral wall portion 213*b* and the perpendicular wall portion 2134 is difficult. If a gap is present in the perpendicularly jointed portion between the lateral wall portion 213*b* and the perpendicular wall portion 2134, water may enter from the gap. Further, when the double-sided adhesive tape 243 is pressed in the state where a gap is present between the double-sided adhesive tape 243 and the lateral wall portion 213*b* or the perpendicular wall portion 2134, the double-sided adhesive tape 243 is stretched along the lateral wall portion 213*b* and the perpendicular wall portion 2134. When the double-sided adhesive tape 243 is thus stretched, the double-sided adhesive tape 243 becomes thinner by the amount that the double-sided adhesive tape is stretched. When the double-sided adhesive tape 243 becomes thinner, the adhesiveness of the double-sided adhesive tape 243 decreases. Then, the waterproof property decreases by the amount that the adhesiveness decreases.

Compared with the case where the lateral wall portion 213b and the perpendicular wall portion 2134 are perpendicularly jointed, according to the present embodiment, the reversely rounded corner 213C1 having the curved face can smoothly connect the lateral wall portion 213b and the perpendicular wall portion 2134. Since the reversely rounded corner 213C1 smoothly connects the lateral wall portion 213b and the perpendicular wall portion 2134, the double-sided adhesive tape 243 attached to the lateral wall portion 213b and the perpendicular wall portion 2134 can be in tight contact with the center-side face of each of the lateral wall portion 213b, the reversely rounded corner 213C1, and the perpendicular wall portion 2134. By bringing the double-sided adhesive tape 243 into tight contact with the lateral wall portion 213b, the reversely rounded corner 213C1, and the perpendicular wall portion 2134, the double-sided adhesive tape 243 can be attached to the left frame member 213 without a gap. This configuration can prevent the double-sided adhesive tape 243 from being stretched along the lateral wall portion 213b and the perpendicular wall portion 2134. Therefore, the information display apparatus 100 according to the present embodiment can ensure waterproofness at the joint portion between the left frame member 213 and the upper left corner member 222.

Further, in the left frame member 213 according to the present embodiment, the center-side face 213C2S of the reversely rounded corner 213C2 (the surface opposite to the hollow 2130, obliquely positioned on the upper right in FIG. 16) is a curved face having a radius of curvature R3. With the curved center-side face 213C2S of the reversely rounded corner 213C2 having the radius of curvature R3 in cross section, the double-sided adhesive tape 243 can be in tight contact with the center-side face of each of the lateral wall portion 2135, the reversely rounded corner 213C2, and the perpendicular wall portion 2136. By bringing the double-sided adhesive tape 243 into tight contact with the center-side face of each of the lateral wall portion 2135, the reversely rounded corner 213C2, and the perpendicular wall portion 2136, the information display apparatus 100 according to the present embodiment can secure the waterproofness in the joint portion between the left frame member 213 and the upper left corner member 222. For example, assume that the reversely rounded corner 213C2 is not a curved face, but the lateral wall portion 2135 and the perpendicular wall portion 2136 are jointed in a perpendicular manner. In such a perpendicularly jointed portion, attaching the double-sided adhesive tape 243 without a gap to the jointed portion between the lateral wall portion 2135 and the perpendicular wall portion 2136 is difficult. If a gap is present in the perpendicularly jointed portion between the lateral wall portion 2135 and the perpendicular wall portion 2136, water may enter from the gap. On the other hand, in the present embodiment, the lateral wall portion 2135 and the perpendicular wall portion 2136 are smoothly coupled via the reversely rounded corner 213C2 having a curved face. Since the reversely rounded corner 213C2 smoothly connects the lateral wall portion 2135 with the perpendicular wall portion 2136, the double-sided adhesive tape 243 can be in tight contact with the center-side face of each of the lateral wall portion 2135, the reversely rounded corner 213C2, and the perpendicular wall portion 2136 when attaching the double-sided adhesive tape 243 thereto. With the tight contact of the double-sided adhesive tape 243, the information display apparatus 100 according to the present embodiment can ensure waterproofness at the joint portion between the left frame member 213 and the upper left corner member 222.

Further, in the left frame member 213 according to the present embodiment, the center-side face 213AS of the rounded corner 213A (the surface opposite to the hollow 2130, obliquely positioned on the upper right in FIG. 16) is curved and has the radius of curvature R1 in cross section. With the curved center-side face of the rounded corner 213A that is curved having the radius of curvature R1 in cross section, the double-sided adhesive tape 243 can be in tight contact with the center-side face of each of the perpendicular wall portion 2134, the rounded corner 213A, and the lateral wall portion 2135. Further, with the curved center-side face 213AS of the rounded corner 213A having the radius of curvature R1 in cross section, the double-sided adhesive tape 243 can be in tight contact with a reversely rounded corner 222C of the upper left corner member 222 to be coupled with the rounded corner 213A.

A description is given of the radii of curvature R1, R2 and, R3 of the rounded corner 213A, the reversely rounded corner 213C1, and the reversely rounded corner 213C2. The radii of curvature R1, R2 and R3 are preferably five times or more of the thickness of the double-sided adhesive tape 243, more preferably, 10 times or more of the thickness of the double-sided adhesive tape 243, and, yet more preferably, 20 times or more of the thickness of the double-sided adhesive tape 243. By setting the radius of curvature as described above, the double-sided adhesive tape 243 can be attached to the joint region 213R in tight contact therewith.

The perpendicular wall portion 2136 is an example of a first wall portion, the lateral wall portion 2135 is an example of a second wall portion, and the reversely rounded corner 213C2 is an example of a corner portion (an example of a first corner portion). The center-side face 213C2S of the reversely rounded corner 213C2 (on the upper right in FIG. 16) is an example of a first curved face. Further, the perpendicular wall portion 2134 is an example of the third wall portion, the rounded corner 213A is an example of another corner portion, and the center-side face 213AS (the face on the upper right in FIG. 16) of the rounded corner 213A is an example of a second curved face.

Although the left frame member 213 has been described so far, the right frame member 211 and the upper frame member 212 also have a similar shape to the shape of the left frame member 213. Specifically, the right frame member 211 and the upper frame member 212 include joint regions at both ends thereof and have cross-sectional shapes similar to that of the left frame member 213.

Corner Member

Figure 17A:
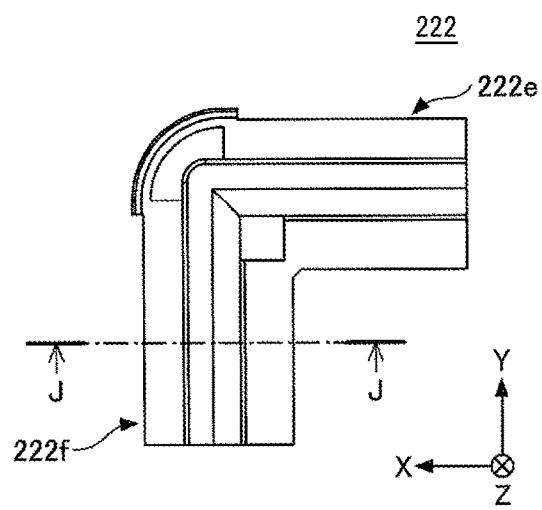
FIGS. 17A, 17B, 17C, and 17D are respectively a front view, a bottom view, a side view, and a rear view of the corner member illustrated in FIGS. 10 and 11.
Figure 17B:
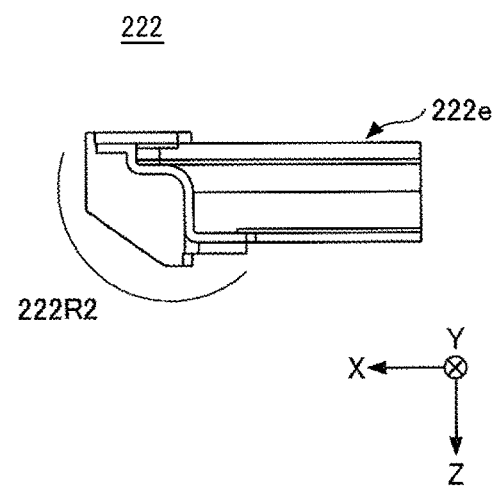
Figure 17C:
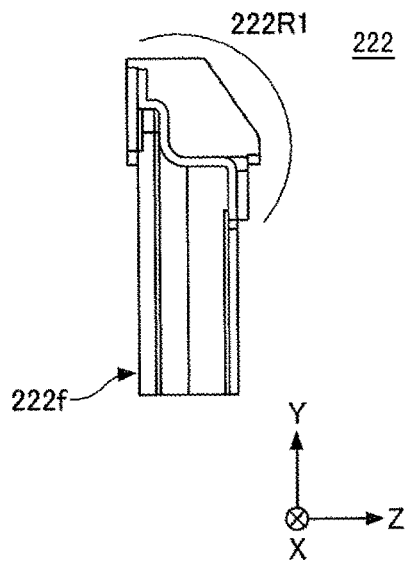
Figure 17D:
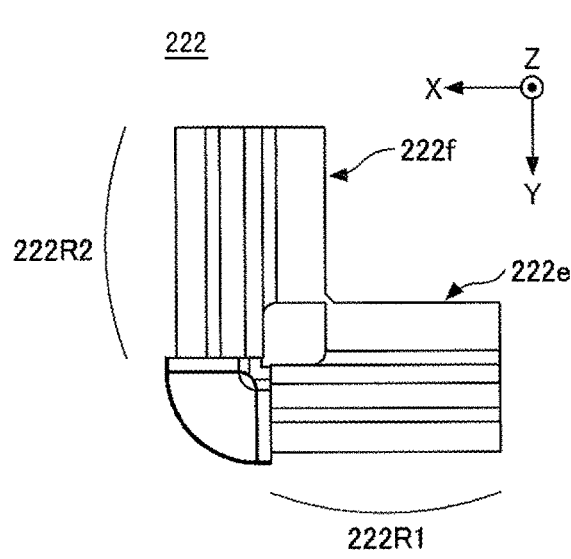

A description is given below of the upper left corner member 222. FIGS. 17A, 17B, 17C, and 17D are views of the upper left corner member 222 of the information display apparatus 100 according to the present embodiment. FIG. 17A is a front view of the upper left corner member 222, FIG. 17B is a bottom view thereof, FIG. 17C is a side view thereof, and FIG. 17D is a rear view thereof.

The upper left corner member 222 has a substantially L-shape. The back side of the upper left corner member 222 includes the joint region 222R1 joined to the upper frame member 212 and the joint region 222R2 joined to the left frame member 213.

Figure 18:
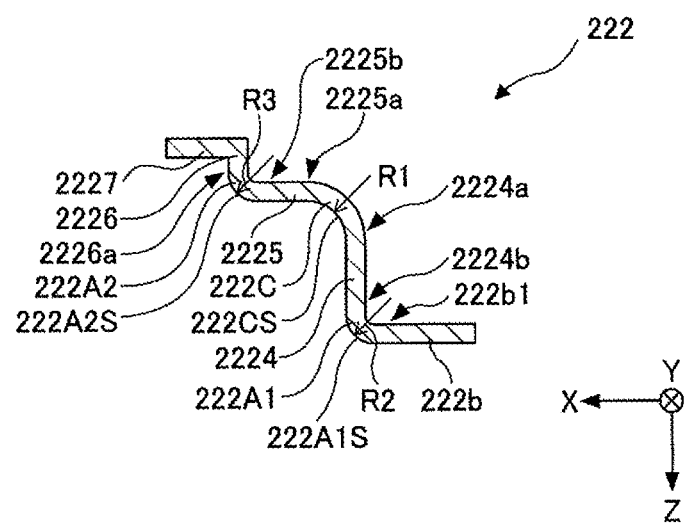
FIG. 18 is a cross-sectional view of the corner member illustrated in FIGS. 10, 11, and 17A to 17D.

A description is given of the joint region 222R2 joined to the left frame member 213, as an example of the joint regions of the upper left corner member 222. FIG. 18 is a cross-sectional view of the upper left corner member 222 of the information display apparatus 100 according to the present embodiment. Specifically, FIG. 18 is a cross-sectional view along line J-J in FIG. 17A. The upper left corner member 222 includes, in the joint region 222R2, a lateral wall portion 222b, a perpendicular wall portion 2224, a lateral wall portion 2225, a perpendicular wall portion 2226, and a lateral wall portion 2227. When the upper left corner member 222 is attached to the left frame member 213, the lateral wall portion 222b, the perpendicular wall portion 2224, the lateral wall portion 2225, the perpendicular wall portion 2226, and the lateral wall portion 2227 thereof oppose the perpendicular wall portion 2134, the lateral wall portion 2135, the perpendicular wall portion 2136, and the lateral wall portion 2138 of the left frame member 213, respectively.

Further, the perpendicular wall portion 2224 and the lateral wall portion 2225 are coupled via the reversely rounded corner 222C. The reversely rounded corner 222C connects a front end 2224a of the perpendicular wall portion 2224 and a right end 2225a of the lateral wall portion 2225. A face 222CS on the left frame member 213 side of the reversely rounded corner 222C is a curved face having the radius of curvature R1 in cross section, corresponding to the rounded corner 213A of the left frame member 213. The reversely rounded corner 222C is concave when viewed obliquely from the lower left in FIG. 18. Further, the lateral wall portion 222b and the perpendicular wall portion 2224 are coupled via a rounded corner 222A1.

The rounded corner 222A1 connects a left end 222b1 of the lateral wall portion 222b and aback end 2224b of the perpendicular wall portion 2224. A face 222A1S on the left frame member 213 side of the rounded corner 222A1 is a curved face having the radius of curvature R2 in cross section, corresponding to the reversely rounded corner 213C1 of the left frame member 213. The rounded corner 222A1 is convex when viewed obliquely from the lower left to the left in FIG. 18.

The lateral wall portion 2225 and the perpendicular wall portion 2226 are coupled via a rounded corner 222A2. The rounded corner 222A2 connects a left end 2225b of the lateral wall portion 2225 and a back end 2226a of the perpendicular wall portion 2226. A face 222A2S on the left frame member 213 side of the rounded corner 222A2 is a curved face having the radius of curvature R3 in cross section, corresponding to the reversely rounded corner 213C2 of the left frame member 213. The rounded corner 222A2 is convex when viewed obliquely from the lower left in FIG. 18.

When the upper left corner member 222 is attached to the left frame member 213, the reversely rounded corner 222C, the rounded corner 222A1, and the rounded corner 222A2 thereof respectively oppose the rounded corner 213A, the reversely rounded corner 213C1, and the reversely rounded corner 213C2 of the left frame member 213.

As described above, the double-sided adhesive tape can be attached, in tight contact, to the joint region of the corner member since the corner member includes a reversely rounded corner or a rounded corner in the joint region.

Figure 19:
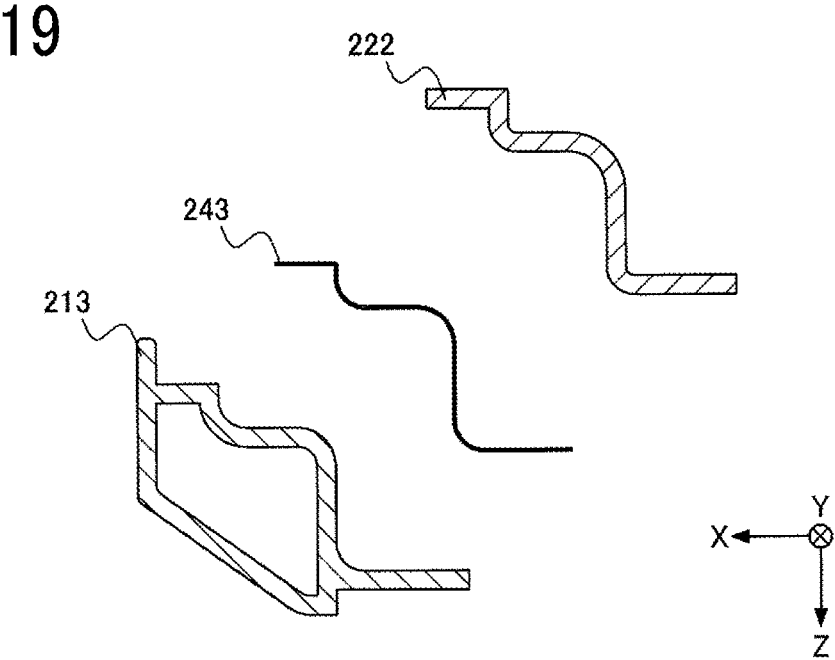
FIG. 19 is a diagram illustrating jointing between the frame member and the corner member illustrated in FIGS. 11 to 18.

FIG. 19 is a diagram illustrating the coupling of the left frame member 213 with the upper left corner member 222 of the information display apparatus 100 according to the present embodiment. The left frame member 213 and the upper left corner member 222 are shaped so that the faces joined with each other face each other. In other words, the joint region 222R2 of the upper left corner member 222 has a shape corresponding (a matching shape) to the joint region 213R1 of the left frame member 213 to be joined. Since the double-sided adhesive tape 243 is interposed therebetween, the left frame member 213 and the upper left corner member 222 can be joined in tight contact with each other. By bringing the left frame member 213 and the upper left corner member 222 into tight contact with each other, the information display apparatus 100 according to the present embodiment can ensure waterproofness at the joint portion between the left frame member 213 and the upper left corner member 222.

The upper right corner member 221 is similar in shape with the upper left corner member 222.

Figure 20:
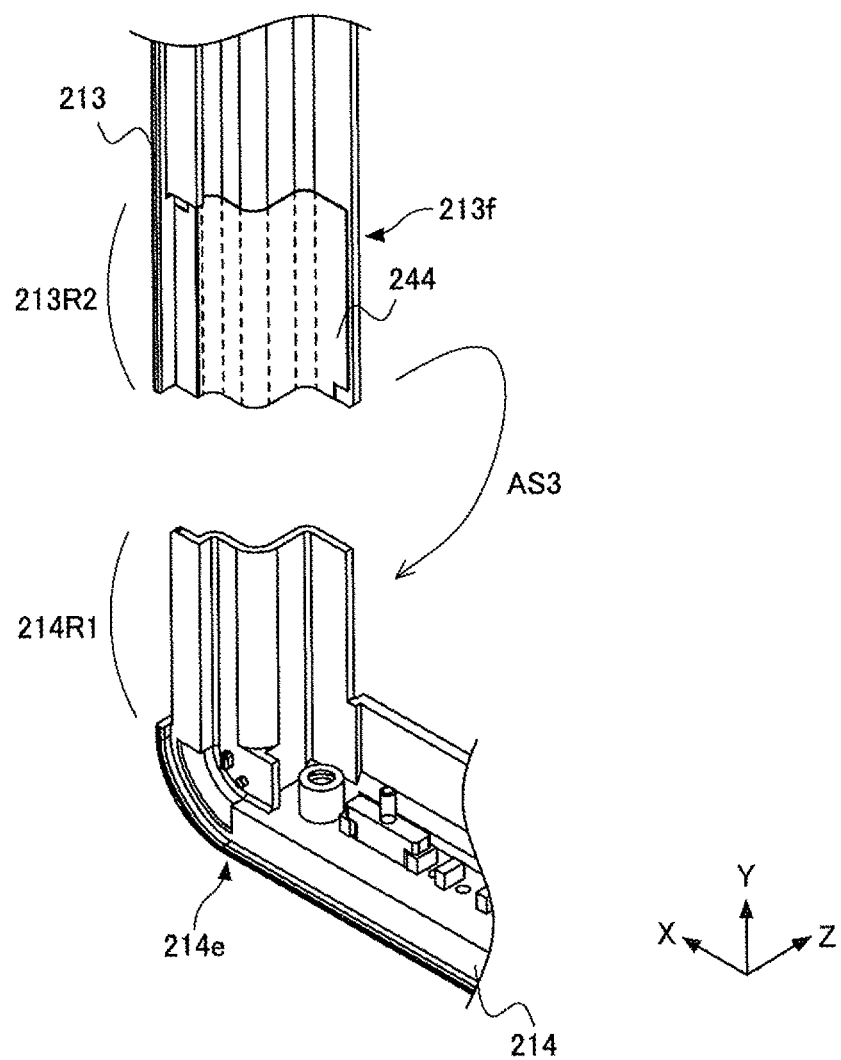
FIG. 20 is another exploded perspective view of the housing frame illustrated in FIG. 9 and illustrates another frame member thereof.

Although the upper left corner member 222 joins two frame members, namely, the upper frame member 212 and the left frame member 213, the corner member may be integral with one of the frame members. The lower frame member 214 of the information display apparatus 100 according to the present embodiment is described below. FIG. 20 is a cross-sectional view of the left frame member 213 and the lower frame member 214 (an example of a second frame member having an end integral with the second corner member) of the information display apparatus 100 according to the present embodiment. The lower frame member 214 includes a corner member at the left end thereof in FIG. 20. That is, a corner member is integral with the left end of the lower frame member 214. Double-sided adhesive tape 244 is attached to the joint region 213R2 of the left frame member 213. As indicated by arrow AS3 in FIG. 20, the joint region 213R2 of the left frame member 213 is pressed against the joint region 214R1 (an example of the second corner member) of the lower frame member 214 from the back side (−Z side), thereby jointing the left frame member 213 to the lower frame member 214. Similar to the lower frame member 214 according to the present embodiment, the corner member may be integral with one of the frame members. In this case, the information display apparatus 100 includes at least two frame members. Alternatively, in the information display apparatus 100 according to the present embodiment, the lower frame member 214 and the corner member may be separate members.

Figure 21:
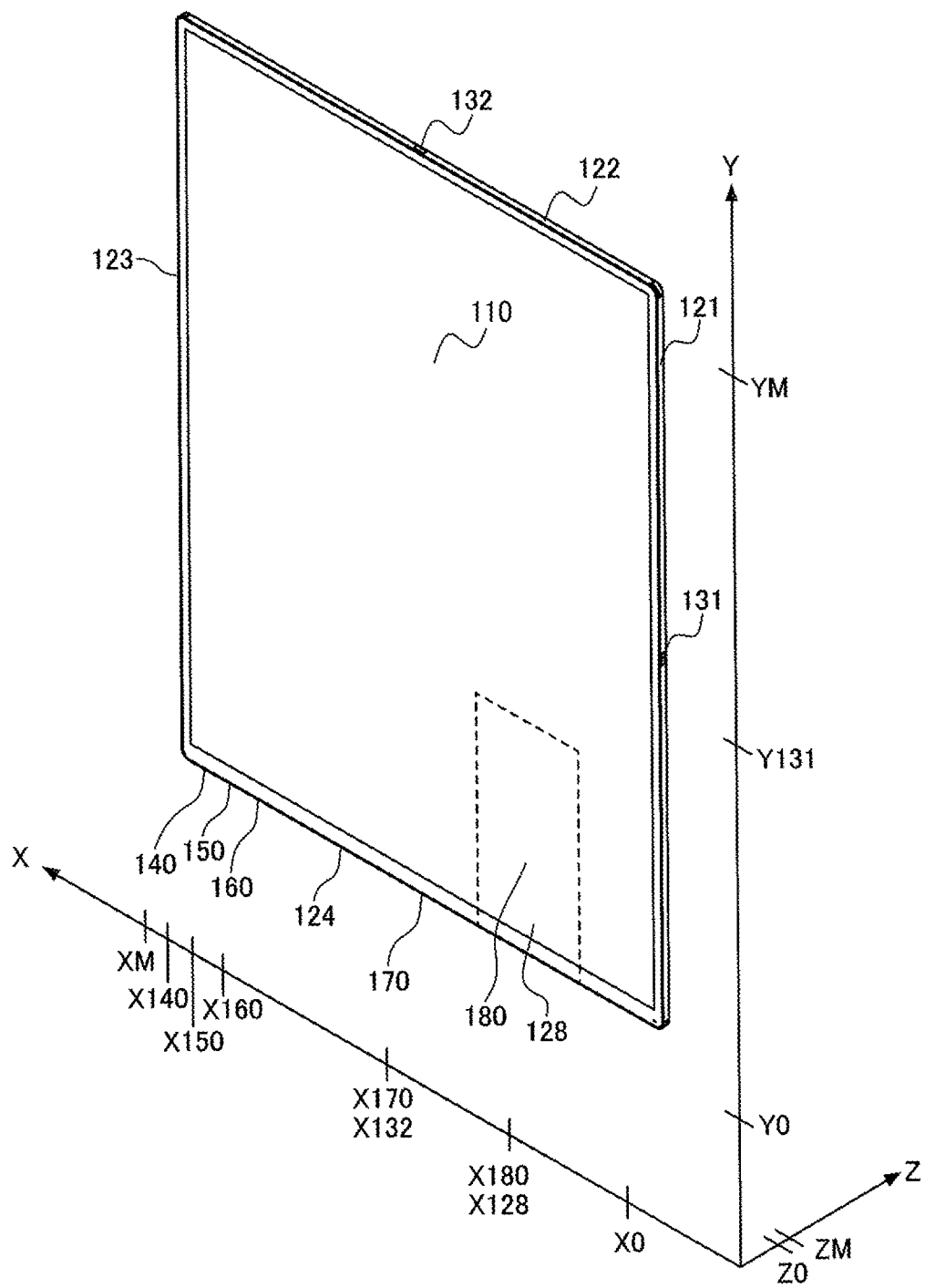
FIG. 21 is another perspective view of the information display apparatus illustrated in FIG. 1.

FIG. 21 is a perspective view of the information display apparatus 100 according to the present embodiment. Specifically, FIG. 21 illustrates coordinates of parts of the information display apparatus 100 placed in a virtual three-dimensional coordinate system (XYZ Cartesian coordinate system).

A description is given below of relative positions of the parts of the information display apparatus 100 according to the present embodiment, placed, for example, in a virtual three-dimensional coordinate space. Assume that, in the virtual three-dimensional coordinates, the information display apparatus 100 according to the present embodiment extends in the range of from coordinates (X0,Y0,Z0) to an X coordinate XM, to a Y coordinate YM, and a Z coordinate ZM. In this case, the right side face 121 is at the X coordinate (X0). The upper face 122 is at the Y coordinate (YM), and is parallel to the ZX plane. The left side face 123 is at the X coordinate (XM), and is parallel to the YZ plane. The lower face is at the Y coordinate (Y0), and is parallel to the ZX plane. The screen 111 of the information display unit 110 is parallel to the XY plane on the Z coordinate (Z0).

The power button 140 is at the X coordinate (X140). The communication connector is at the X coordinate (X150). The card connector cover 160 is at the X coordinate (X160). The power connector 170 is at the X coordinate (X170). The center of the battery 180 in the X-axis direction is at the X coordinate (X180). The center of the battery insertion portion 128 in the X-axis direction is at the X coordinate (X128). Further, the infrared sensor window 132 is at the X coordinate (X132).

The infrared sensor window 131 at the Y coordinate (Y131).

In the information display apparatus 100 according to the present embodiment, the frame member includes the joint region to be coupled to the corner member, and planes are smoothly connected via a curved face in the joint region. With the smooth shape thereof, the joint region can be attached to the corner member with one continuous piece of double-sided adhesive tape (not consisting of several pieces of double-sided adhesive tape). Further, the double-sided adhesive tape can be attached to the frame member without floating from the frame member, that is, in tight contact with the frame member. With the tight-contact attaching, the joint portion between the frame member and the corner member can be waterproof. Since the joint portion between the frame member and the corner member is waterproof, the product assembled by joining the frame member and the corner member can be made waterproof.

Further, as another method to couple the members, screwing may be considered. However, screwing requires increases in the thickness of the frame members, which makes the product heavier. On the other hand, in the information display apparatus 100 according to the present embodiment, the thickness of the frame members can be reduced, so that the weight can be reduced.

As described above, one aspect of this disclosure provides an information display apparatus that includes an information display (e.g., the information display unit 110) having a screen configured to display information, and a housing to which the information display is attached. When the information display apparatus is placed, in a the virtual three-dimensional coordinates defined by an X axis, a Y axis, and a Z axis orthogonal to each other, in a range extending from coordinates (X0,Y0,Z0) to coordinates (XM,YM,ZM), the screen is parallel to an XY plane at the coordinate (Z0). The housing includes frame members (e.g., the upper frame member 212 and the left frame member 213) and a corner member (e.g., the upper left corner member 222) to be coupled with the frame members with double-sided adhesive tape. The frame member includes a joint region to be coupled with the corner member with the double-sided adhesive tape. The joint region includes a first wall portion (e.g., the perpendicular wall portion 2136) extending parallel to the Z axis, a second wall portion (e.g., the lateral wall portion 2135) on a center side of the screen relative to the first wall portion and is parallel to either the X-axis direction or the Y-axis direction, and a corner portion (e.g., the reversely rounded corner 213C2). The corner portion joints the first wall portion and the second wall portion so that a center-side face (e.g., the center-side face 213C2S) of the joint portion becomes a first curved face.

Further, in the above-described information display apparatus, the frame member further includes a third wall portion (e.g., the perpendicular wall portion 2134) extending in the Z-axis direction and disposed closer to the center of the screen than the second wall portion. The frame member further includes another rounded corner (e.g., the rounded corner 213A) that joints the second wall portion and the third wall portion so that the face (e.g., the center-side face 213AS) of the joint portion therebetween on the center side becomes a second curved face.

The effects of the present disclosure are not limited to those described in the above-described embodiments and variations. In regard to these points, the configuration can be modified without departing from the spirit of the present disclosure, and can be appropriately set according to an applied configuration.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

What is claimed is:

1. A display apparatus comprising:
a display including a screen;
a housing including a housing frame to which the display is attached, the housing frame including:
a plurality of frame members surrounding the screen; and
a corner member coupling two of the plurality of frame members with double-sided adhesive tape,
wherein each of the plurality of frame members includes a joint portion coupled with the corner member with the double-sided adhesive tape, the joint portion including:
a first wall portion extending in a direction perpendicular to the screen;
a second wall portion on a center side of the screen relative to the first wall portion, the second wall portion extending in a direction parallel to the screen; and
a corner portion including a curved center-side face connecting a center-side face of the first wall portion and a center-side face of the second wall portion on the center side of the screen.

2. The display apparatus according to claim 1,
wherein the corner portion is referred to as a first corner portion and the curved center-side face of the first corner portion is referred to as a first curved center-side face,
wherein the joint portion further includes:
a third wall portion extending from a center-side end of the second wall portion, the third wall portion extending, in the direction perpendicular to the screen, to a side opposite the first wall portion; and
a second corner portion including a second curved center-side face connecting the center-side face of the second wall portion and a center-side face of the third wall portion on the center side of the screen, the second curved center-side face projecting in a direction different from a projecting direction of the first curved center-side face.

3. The display apparatus according to claim 2,
wherein the projecting direction of the second curved center-side face is reverse to the projecting direction of the first curved center-side face.

4. The display apparatus according to claim 2,
wherein, when the display apparatus is placed in a virtual three-dimensional coordinate space defined by an X axis, a Y axis, and a Z axis orthogonal to each other, the screen is parallel to an XY plane, the first wall portion and the third wall portion are parallel to the Z axis, and the second wall portion is parallel to the XY plane.

5. The display apparatus according to claim 1,
wherein, when the display apparatus is placed in a virtual three-dimensional coordinate space defined by an X axis, a Y axis, and a Z axis orthogonal to each other, the screen is parallel to an XY plane, the first wall portion is parallel to the Z axis, and the second wall portion is parallel to the XY plane.

6. The display apparatus according to claim 1,
wherein the double-sided adhesive tape is one continuous piece.

7. The display apparatus according claim 1,
wherein the curved center-side face of the corner portion has a radius of curvature 10 times or more of a thickness of the double-sided adhesive tape.

8. The display apparatus according claim 1,
wherein the housing frame includes at least two corner members including the corner member; and
wherein each end of each of the plurality of frame members includes the joint portion to which one of the two corner members is joined.

9. The display apparatus according to claim 1,
wherein the corner member is referred to as a first corner member,
wherein the plurality of frame members includes:
a first frame member having the joint portion at each end of the first frame member; and
a second frame member having an end integral with a second corner member, the second corner member coupled with the joint portion of the first frame member.

* * * * *